United States Patent [19]
Mueller et al.

[11] Patent Number: 5,948,975
[45] Date of Patent: Sep. 7, 1999

[54] DEVICE FOR MEASURING THE MASS OF A FLOWING MEDIUM

[75] Inventors: Wolfgang Mueller, Rutesheim; Dieter Tank, Eberdingen; Uwe Konzelmann, Asperg, all of Germany

[73] Assignee: Robert Bosch GmbH, Stuttgart, Germany

[21] Appl. No.: 08/962,120

[22] Filed: Oct. 31, 1997

[30] Foreign Application Priority Data

Oct. 31, 1996 [DE] Germany ............... 196 43 996

[51] Int. Cl.$^6$ .................................................. G01F 1/68
[52] U.S. Cl. ........................ 73/118.2; 73/202; 73/202.5
[58] Field of Search ............................. 73/202, 202.5, 73/118.2, 204.22

[56] References Cited

U.S. PATENT DOCUMENTS 5,381,691  1/1995  Miyazaki et al. ................. 73/118.2
5,563,340  10/1996  Clowater et al. ................. 73/202.5

FOREIGN PATENT DOCUMENTS 44 07 209 A1  of 0000  Germany .

*Primary Examiner*—Max Noori
*Assistant Examiner*—Harshad Patel
*Attorney, Agent, or Firm*—Edwin E. Greigg; Ronald E. Greigg

[57] ABSTRACT

A flow rate meter having a temperature-dependent measuring element in which the device has a measuring conduit, which is equipped with a flow connection that extends from an inlet to an outlet, in order to cause some of the medium flowing in the measuring conduit, in the flow connection, to bypass the measuring element. The device is intended for measuring the mass of a flowing medium, in particular for measuring the aspirated air mass of internal combustion engines.

9 Claims, 2 Drawing Sheets

DEVICE FOR MEASURING THE MASS OF A FLOWING MEDIUM

BACKGROUND OF THE INVENTION

The invention is based on a device for measuring the mass of a flowing medium, or flow rate meter. One such device is already known German offenlegungsschrift DE-OS 44 07 209; U.S. application Ser. No. 08/545,583, filed Nov. 3, 1995; which has a temperature-dependent measuring element accommodated in a measuring conduit.

The measuring conduit extends in the device from an inlet to an outlet, which is adjoined by an S-shaped deflection conduit. The deflection conduit is composed of a first segment and a second segment. The first segment has a rectangular corner and merges at a peripheral face with the second segment. The flowing medium flows from the outlet of the measuring conduit first into the first segment of the deflection conduit; this segment has a larger cross section than the measuring conduit, so that an abrupt flow transition exists, in the form of a step to the first segment. Next, the medium from the first segment of the measuring conduit is deflected by the corner into the transversely adjoining second segment of the deflection conduit and leaves that segment through an outlet opening, and then mixes again with the medium flowing past the device. The measuring conduit has side walls that are embodied in inclined fashion, so that the measuring conduit tapers toward the measuring element.

In an internal combustion engine, the opening and closing of the inlet valves of the various cylinders cause major fluctuations or pulsations in the flow, whose magnitude depends on the aspiration frequency of the individual pistons or on the engine rpm. The pulsations in the flow are propagated from the inlet valves via the intake line to the measuring element in the measuring conduit and onward from there. The effect of the pulsations is that depending on their magnitude, the thermal inertia and orientational insensitivity of the measuring element cause it to produce a measurement outcome that can deviate considerably from the flow velocity prevailing on average in the measuring conduit and the aspirated air mass of the engine that can be calculated from this velocity. The measuring conduit and the deflection conduit are adapted to one another in their dimensions such that if there is a pulsating flow in the intake line, the incorrect indication of the measuring element that occurs because of the flow fluctuations is minimal. Nevertheless, at high pulsation frequencies and a significant pulsation amplitude, fluidic-acoustical processes in the deflection conduit can still cause an incorrect indication of the aspirated air mass. This incorrect indication comes about particularly because downstream of the step, or tearing edge, from the measuring conduit to the deflection conduit major eddies can arise, whose rotational impulse varies only insignificantly when there is a pulsating oncoming flow. Hence there is a major difference in the relative velocities at the edge of the eddy and downstream of the measuring element, so that severe shear flows are present at the boundary face that are the cause of the generation of acoustical waves (sound waves) in the deflection conduit and the measuring conduit. These acoustical waves can interfere with the measurement signal of the measuring element, resulting in a minimum indication.

OBJECT AND SUMMARY OF THE INVENTION

The flow rate meter according to the invention has the advantage over the prior art that regardless of a fluctuating or pulsating flow, a persistently precise measurement outcome is attainable.

By means of the provisions recited herein, advantageous further features of and improvements to the device disclosed are possible.

An inclined embodiment of a peripheral face of the deflection conduit is especially advantageous; it is thus possible to further improve the outcome of measurement without having to change the adaptation of the total conduit, comprising the measuring conduit and the deflection conduit, so that a compact design of the device can be preserved.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
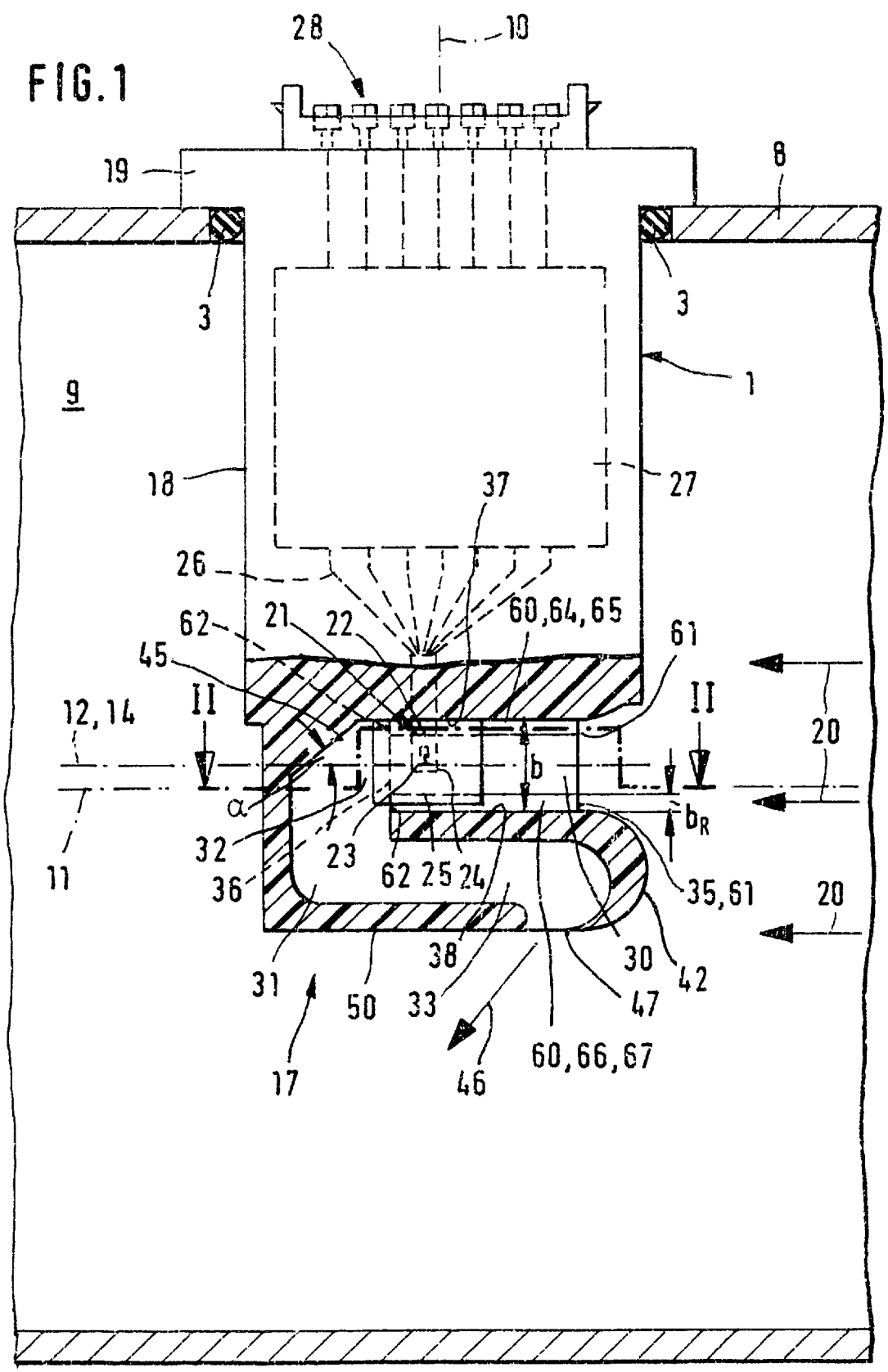
FIG. 1, in a fragmentary sectional view, shows a side view of a device embodied according to the invention.

FIG. 1 in a fragmentary sectional view shows a side view of a flow rate meter 1 or device that is used to measure the mass of a flowing medium, in particular the aspirated air mass of internal combustion engines. The engine may be a mixture-compressing engine with externally supplied ignition, or an air-compressing, self-igniting engine. The device 1 preferably has a slender, rodlike, parallelepiped form extending in elongated fashion in the direction of an insertion axis 10, and is introduced in plug-in fashion, for instance, into an opening made in a wall 8 of an intake line 9. By means of a sealing ring 3, the device 1 is sealed off in the wall 8 and is firmly joined to it, for instance by means of screws not shown in further detail. The wall 8, shown shaded, is part of the for instance cylindrically embodied intake line 9, through which the engine can aspirate air from the ambient atmosphere via an air filter, not shown in further detail. The wall 8 of the intake line 9 defines a flow cross section, which in the case of the cylindrical intake line 9 has an approximately circular cross section, and in the middle of which a center axis 11 extends in the axial direction, parallel to the wall 8; this axis is oriented at right angles to the insertion axis 10. The device 1 protrudes with a part, hereinafter called the measuring portion 17, into the flowing medium; the measuring portion 17 is located for instance approximately in the middle of the intake line 9, so that the flow can strike the measuring portion 17 as much as possible without interfering peripheral influences from the wall 8. The flow direction is represented in FIGS. 1 and 2 by corresponding arrows 20 and extends there from right to left.

The device 1 is composed in one piece of the measuring portion 17, a carrier portion 18, and a mounting portion 19 and by way of example is made of plastic by plastic injection molding. A measuring element 21 is embodied for instance in the form of a so-called micromechanical component and has a carrier body 22 with a membranous sensor region of extremely slight thickness, produced by etching out of the body of the carrier body, and a plurality of resistor layers, also created by etching out of the body, which form at least one temperature-dependent measuring resistor 23 and form a heating resistor, for instance. The measuring element 21 accordingly comprises at least one platelike carrier body 22, made of ceramic, for instance, and at least one temperature-dependent resistor 23. The carrier body 22 is accommodated flush in a recess 24 of a platelike receptacle 25, made for instance of metal, and is retained there for instance by adhesive bonding. The receptacle 25 has a leading edge, facing into the flow 20, which is preferably beveled. The individual resistor layers 23 of the measuring element 21 are electrically connected, by means of lead lines 26 extending in the interior of the device 1, to an electronic evaluation circuit 27, shown in dashed lines in the drawing and for instance including a bridgelike resistance measurement circuit. By way of example, the evaluation circuit 27 is accommodated in the carrier portion 18 or the mounting portion 19 of the device 1. If the evaluation circuit 27 is accommodated in the carrier portion 18, for instance, then it is possible to cool the evaluation circuit by means of a cooling body from the medium flowing in the intake line 9. With a plug-in connection 28 provided on the mounting portion 19, the electrical signals furnished by the evaluation circuit 27 can be delivered for evaluation, for instance including to a further electronic control unit. No more detailed description of the function and structure of the temperature-dependent measuring elements will be made here, because one skilled in the art can find this in the prior art.

Figure 2:
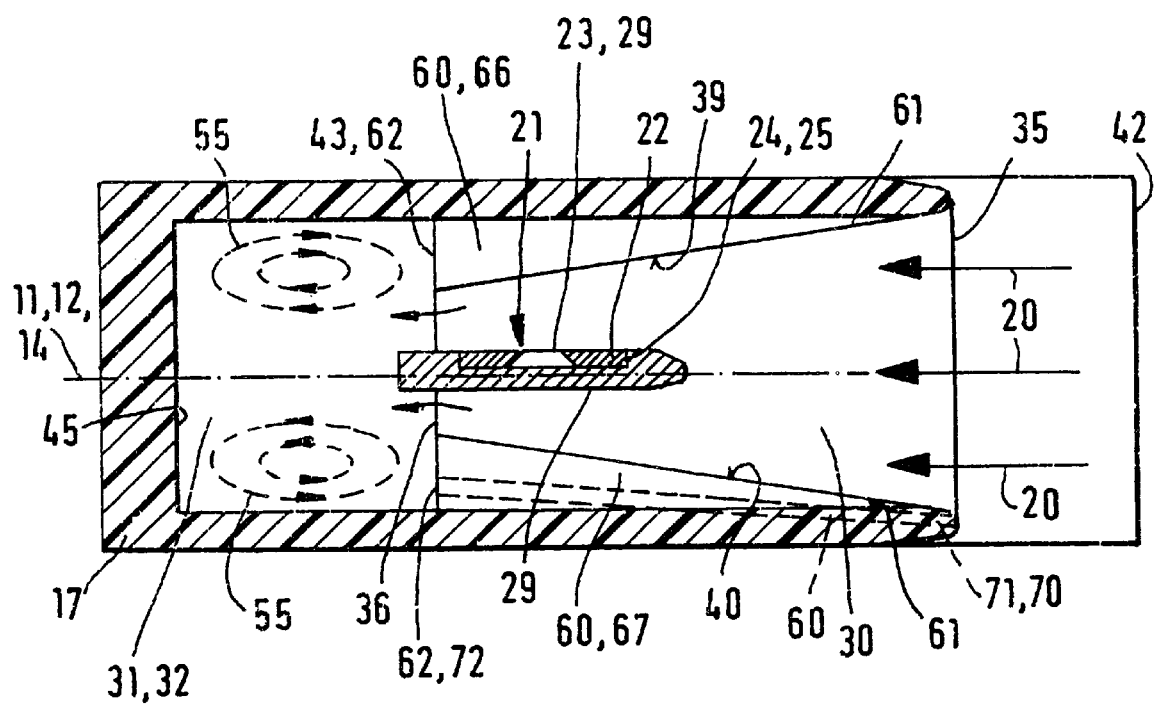
FIG. 2 shows a section through the device taken along line II—II in FIG. 1.

As shown in FIG. 2, which is a sectional view along a line II—II of FIG. 1, the measuring portion 17 of the device 1 has a parallelepiped shape and has a measuring conduit 30 which extends along a measuring conduit axis 12, extending centrally in the measuring conduit 30, from an inlet 35, for instance of rectangular cross section, to an outlet 36, which for instance also has a rectangular cross section. The device 1 is installed in the intake line 9 preferably with the measuring conduit axis 12 parallel to the center axis 11. However, it is also possible to install the device 1 in a rotated position. As shown in FIG. 1, the measuring conduit 30 merges with an S-shaped deflection conduit 31. The measuring conduit 30 is defined by a top face 37, farther away from the center axis 11, and a bottom face 38, closer to the center axis 11, as well as by two side faces 39, 40 shown in FIG. 2. The top face 37 and bottom face 38 extend parallel to the center axis 11. The receptacle 25 for the platelike measuring element 21 is retained on one side in the carrier portion 18 on the top face 37, so that the receptacle 25 with the measuring element 21 is bathed by the medium on both of the side faces of the evaluation circuit 27 extending approximately parallel to the measuring conduit axis 12. As shown in FIG. 2, the side faces 39, 40 of the measuring conduit 30 extend obliquely to a plane 14 defined by the measuring conduit axis 12 and the insertion axis 10, and they form an acute angle with it so that the measuring conduit 30, seen in the flow direction 20, tapers axially and then discharges at a smallest cross section, at the outlet 36, into a first segment 32 of the deflection conduit 31. The measuring element 21 is disposed in the receptacle 25 upstream of the narrowest point of the measuring conduit 30, or in other words upstream of the outlet 36 in the measuring conduit 30. The tapering in the flow direction 20 of the measuring conduit 30 has the effect that the most unimpeded possible, uniform parallel flow can prevail in the region of the measuring element 21. To avert flow separations in the region of the inlet 35 of the measuring conduit 30, the inlet region of the measuring conduit 30 has a rounded boundary face 42, shown in FIG. 1.

The deflection conduit 31, composed of the first segment 32 and a second segment 33 adjoining it, is preferably rectangular in cross section, corresponding approximately to the cross-sectional area of the inlet 35 of the measuring conduit 30, so that at the outlet 36, between the measuring conduit 30 and the deflection conduit 31, the flow cross section increases abruptly at a step 43. The medium flowing in the measuring conduit 30, downstream of the outlet 36, first reaches the first segment 32; at a peripheral face 43 of the first segment 32 opposite the outlet 36, the flow is deflected, and from there it flows on into the second segment 33. As indicated by an arrow 46 in FIG. 1, the medium then leaves the second segment 33 via an outlet opening 47 and enters the intake line 9 again essentially crosswise to the flow direction 20. Like the deflection conduit 31, the outlet opening 47 has a rectangular cross section, for example, and is provided on a lower outer face 50 of the measuring portion 17 oriented parallel to the measuring conduit axis 12.

By means of the abrupt increase in flow that occurs at the step 43 between the measuring conduit 30 and the deflection conduit 31, eddies 55 shown in dashed lines in FIG. 2 can be brought about, whose rotational impulse varies only insubstantially in the presence of a pulsating oncoming flow. In such eddies 55, there is a major difference in the relative velocities of the medium flow at the periphery of the eddies and downstream of the measuring element 31; as a result, major shear flows can arise at the boundary face, which are the cause for the generation of acoustical waves (sound waves) in the first segment 32 of the deflection conduit 31, which then affect the measuring conduit 30. To avoid such eddies 55, the invention provides the creation of a flow connection 60, which has an inlet 61 located upstream of the measuring element 21 and an outlet 62 located downstream of the measuring element 21, so that in the flow connection 60 a portion of the flow of medium in the measuring conduit 30 is made to bypass the measuring conduit 30. This kind of flow connection 60 may be embodied for instance in the form of at least one channel 64; 65; 66; 67, which is recessed from the side faces 39, 40 of the measuring conduit 30, for instance by milling or by recessing in the injection molding process. As shown in FIG. 1, two channels each 64, 65 on the one hand and 66, 67 on the other may be provided in the respective side faces 39 and 40; two channels 64, 65 preferably extend in the vicinity of the top face 37, and two channels 66, 67 preferably extend in the vicinity of the bottom face 38 of the measuring conduit 30. The channels 64, 65, 66, 67 extend as far as the step 43 and make it possible for a partial flow of the medium flowing in the measuring conduit 30 to pass, unaccelerated, into the first segment 32 of the deflection conduit 31; this prevents eddies 55, shown in dashed lines in FIG. 2, from developing downstream of the step 43, and hence there is no generation of sound waves in the first segment 32 of the deflection conduit 31. The width $b_R$ of at least one of the channels, 64, 65, 66, 67 in the direction of the insertion axis 10 should amount to at most approximately 30% of the channel width b of the measuring conduit 30 in the direction of the insertion axis 10.

The positive effect of the channels 64, 65, 66, 67 can be increased still further by embodying the peripheral face 45 of the first segment 32 of the deflection conduit 31 as inclined toward the outlet 36. Preferably, an angle of inclination α defined by the measuring conduit axis 12 and the peripheral face 45 is then approximately 45°. However, it is also possible for the peripheral face 45 to be embodied with an angle of inclination α that is in the range from approximately 30 to 60°. The peripheral face 45, disposed in the projection of the outlet 36 in the flow direction 20 onto the opposite wall of the deflection conduit 31 makes it possible to divert the medium, flowing from the outlet 36 of the measuring conduit 30 into the first segment 32, into the second segment 33 along the peripheral face 45. The peripheral face 45 then extends approximately from the extension of the top face 37 as far as the center axis 11 in FIG. 1, approximately in the direction of the insertion axis 10. The inclined embodiment of the peripheral face 45 in the deflection conduit 31 has the effect that any disturbances in the flow that may originate at the outlet 36 of the measuring conduit 30, for instance in the form of sound waves, will be reflected by the peripheral face 45, which then cancels out their effect.

In a modification of the invention, it is also possible, instead of the channels 64, 65, 66, 67, to provide a flow connection in the form of a bore 70, for instance, which shown in FIG. 2 is provided for instance in the side wall 40 of the measuring conduit 30. The bore 70 is preferably circular in cross section and has an inlet 71 at the inlet 35 of the measuring conduit 30 and an outlet 72 at the step 43 of the first segment 32 of the deflection conduit 31. The bore 70 provided for instance in the side wall 40 of the measuring conduit 30 then for instance extends in inclined fashion relative to the measuring conduit axis 12, approximately parallel to the side wall 40.

The foregoing relates to a preferred exemplary embodiment of the invention, it being understood that other variants and embodiments thereof are possible within the spirit and scope of the invention, the latter being defined by the appended claims.

The invention claimed and desired to be secured by Letters Patent of the United States is:

1. A device for measuring the mass of a flowing medium of internal combustion engines, comprising a measuring portion (17) with a measuring element bathed by the flowing medium, said measuring element is disposed in a measuring conduit (30) in said measuring portion that extends along a measuring axis (12) in the device, the measuring conduit extends from an inlet (35) to an outlet (36) which merges with a curved deflection conduit (31) which is adjoined at the outlet (36) with a step (43) which provides an abruptly increased flow cross section to the deflection conduit (31) into which the medium flows from the outlet (36), a bypass flow connection (60) is provided in a wall of said measuring conduit (30), said bypass flow connection (60), carries some of the medium flowing in the measuring conduit (30) around the measuring element (21) into the deflection conduit (31).

2. A device in accordance with claim 1, in which the bypass flow connection (60) is embodied in the form of at least one channel (64; 65; 66; 67), which is provided in a side face (39; 40) of a wall of the measuring conduit (30).

3. A device in accordance with claim 2, in which at least one channel (64, 65, 66, 67) of said bypass flow connection has a width $b_R$ that at most is approximately 30% of the width (b) of the measuring conduit (30).

4. A device in accordance with claim 2, in which each side face (39; 40) of the measuring conduit (30) has at least two bypass flow connection channels (64, 65; and 66,67, respectively).

5. A device in accordance with claim 2, in which the bypass flow connection channels (64, 65, 66, 67) extend in a vicinity of a bottom face (38) or in a vicinity of a top face (37) of the measuring conduit (30).

6. A device in accordance with claim 2, in which the at least one bypass flow connection channel (64, 65, 66, 67) is recessed in a form of a milling out of a side face (39; 40).

7. A device in accordance with claim 2, in which the bypass flow connection channels (64, 65, 66, 67) extend in a vicinity of a bottom face (38) and in a vicinity of a top face (37) of the measuring conduit (30).

8. A device in accordance with claim 1, in which the bypass flow channel connection (60) is embodied in a form of a bore (70), which has an inlet (71), located upstream of the measuring element (21), and an outlet (72), located downstream of the measuring element (21).

9. A device in accordance with claim 8, in which the inlet (71) of the bore (70) begins at the inlet (35) of the measuring conduit (30), and the outlet (71) merges into the curved deflection conduit (31).

* * * * *